United States Patent

Schmidt et al.

[11] Patent Number: 5,707,025
[45] Date of Patent: Jan. 13, 1998

[54] HUB FOR WINDING MAGNETIC TAPES

[75] Inventors: Jürgen Schmidt; Bernd Scholtysik, both of München, Germany

[73] Assignee: EMTEC Magnetic GmbH, Ludwigshafen, Germany

[21] Appl. No.: 688,950

[22] Filed: Jul. 31, 1996

[30] Foreign Application Priority Data

Aug. 1, 1995 [DE] Germany .................. 295 12 342.7

[51] Int. Cl.$^6$ .................................................. B65H 75/02
[52] U.S. Cl. ................................................... 242/610
[58] Field of Search .......................... 242/160.1, 160.4, 242/610, 610.5, 610.6, 613

[56] References Cited

U.S. PATENT DOCUMENTS

| 2,659,543 | 11/1953 | Guyer ........................... 242/610 |
| 3,229,928 | 1/1966 | Burgess et al. ................ 242/613 |
| 3,493,161 | 2/1970 | Billings et al. ............... 242/610.6 |
| 4,832,276 | 5/1989 | Gebhardt et al. . |
| 5,514,429 | 5/1996 | Kamihgaraguchi et al. ...... 242/610 |

FOREIGN PATENT DOCUMENTS

| 613 849 | 9/1994 | European Pat. Off. . |
| 24 57 539 | 6/1976 | Germany . |
| 35 12 919 | 10/1986 | Germany . |
| 36 10 557 | 10/1987 | Germany . |
| 38 23 688 | 7/1988 | Germany . |
| 93 05 304 U | 7/1993 | Germany . |
| 8137367.8 | 8/1994 | Germany . |
| 04366421 | 6/1991 | Japan . |
| WO 90/11957 | 10/1990 | WIPO . |

*Primary Examiner*—John P. Darling
*Attorney, Agent, or Firm*—Keil & Weinkauf

[57] ABSTRACT

A cylindrical hub for winding web-like or tape-like magnetic recording media of relatively great length. With a winding tension of not more than 2N/cm width of the wound magnetic recording medium, the skew measured over the total length of the wound recording medium should be not more than 5 μs. The length of the wound recording medium is at least 5,000 m; the hub may consist, for example, of aluminum, steel or hard pertinax. It was found that the conditions are fulfilled by a hub in which the compression is less than 0.3% of the hub diameter.

5 Claims, 1 Drawing Sheet

HUB FOR WINDING MAGNETIC TAPES

BACKGROUND OF THE INVENTION

1. Field of the Invention

The present invention relates to a hollow cylindrical hub for winding web-like or tape-like magnetic recording media of relatively great length.

Magnetic recording media of the abovementioned generic type consist in general of a flexible base, for example polyethylene terephthalate or polyethylene napththalate or the like, having a width of 60–120 cm and a thickness of from 5 to about 100 µm, and one or more magnetic dispersions which are applied thereon and may have a thickness of from less than 1 to 20 µm. If required, an adhesion-promoting layer is also present between the base and the lowermost magnetic layer, and an antiwear layer is also present on the magnetic layer. Immediately after the production of the magnetic recording media thus described in conventional working apparatuses, the magnetic web is wound on hubs, in some cases in considerable lengths of more than 5,000 m, after passing through various processing zones, such as orientation of magnetic particles, drying and, if required, compaction by calendering. The winding tension must be sufficiently great to avoid the entrainment of air or floating of the wound layers during winding; on the other hand, the winding tension must not exceed a maximum value, since otherwise the magnetic recording media will be damaged by scratching or overextension and will thus become useless.

The same applies to winding magnetic recording media which are split longitudinally to the width for use, for example to half inch (1.27 cm), 2 inches (5.08 cm) or 3.81 mm, and then wound on hubs of about the same width. Here too, particularly during winding of relatively great lengths, a certain tape tension is required to prevent the pancakes from falling apart or the layers from shifting relative to one another during transport. In general, the winding tension is from 0.5 to 2 Newton per centimeter width of the recording medium, depending on the winding apparatus and on the requirements set for the magnetic recording media produced.

2. Description of the Related Art

The prior art describes a large number of cylindrical hubs which are used for winding recording media. DE-U 81 37 367 describes a paper tube for winding magnetic tapes, the cross-section of which tube has the shape of a trapezoid or parallelogram and is wound spirally. The resulting surface is buffed and colored and has extremely good surface smoothness. WO 90/11 957 and DE-U 93 05 304 disclose hubs for deformable material, consisting of a rigid cylindrical sleeve with a coating of deformable material, in order to avoid imprints in the wound recording medium. DE-C 35 12 919 describes a hub for winding magnetic tape webs, the surface of the hub body being coated with magnetic rubber in a certain magnetization direction in order to attract the web and to wind it without folds. U.S. Pat. No. 4,832,276 discloses a two-layer hollow cylindrical hub consisting of a rigid inner cylinder and a compressible outer sleeve, which are connected to one another. Hubs of similar design are described in EP-A 0 613 849, DE-A 36 10 557 and as bobbin sleeves in DE-A 24 57 539.

U.S. Pat. No. 3,229,928 discloses a tape or film spool comprising aluminum and plastic flanges. Winding pressure and skew value problems are not mentioned therein.

The cited prior art thus essentially indicates that recording media, in particular magnetic tapes, are wound on compressible cores or hubs having a flexible surface, in order to avoid damage to the web. On the other hand, investigations by the applicant have shown that, when relatively great lengths are wound on hubs which suffer a compression of more than 0.3% of their diameter, the magnetic recording medium wound in this manner has an intolerably high skew error close to the beginning of its web, ie. close to the core. The skew errors referred to are those which occur as time-base errors during recording, in particular helical scan recording, as a result of a change in the length of a magnetic tape between the recording and playback of a video signal. Skew errors are caused by a change in the length of the magnetic recording medium due to extension or compression. As is evident from DE-A 38 23 688 of the same applicant, such skew errors give rise to time-base errors from a certain magnitude of about 5–10 µs, for example in helical scan video recording methods, which time-base errors may lead to visible disturbances of the image in the form of distortions.

If a hub suffers a compression during winding of a great web length at the necessary high winding tension, the beginning of the web adjacent to the hub is likewise compressed on compression of the hub. In order to cancel out this effect, the wound magnetic recording medium can be subjected to a heat treatment, the previously compressed parts relaxing again. Such a treatment, which has the disadvantage of an additional step, is described, for example, in JP-A 04-366 421.

It is an object of the present invention to provide a hub by means of which the magnetic recording media of relatively great length can be wound without major compression and consequent skew errors and without an additional processing step, such as heating, even at high winding speeds and high web tensions.

SUMMARY OF THE INVENTION

We have found that this object is achieved, according to the invention, by a hub wherein the diameter of the hub divided by the modulus of elasticity of the hub is less than the factor $6 \cdot 10^{-3}$ divided by the winding pressure on the winding surface of the hub in a formula $$\frac{D}{E \cdot w} < 0.006/p$$

in which p=winding pressure on the winding surface of the hub
D=hub diameter
E=modulus of elasticity of the hub material
w=wall thickness of the hub.

BRIEF DESCRIPTION OF THE DRAWINGS

The invention is illustrated below with reference to the drawings, in which.

Figure 1:
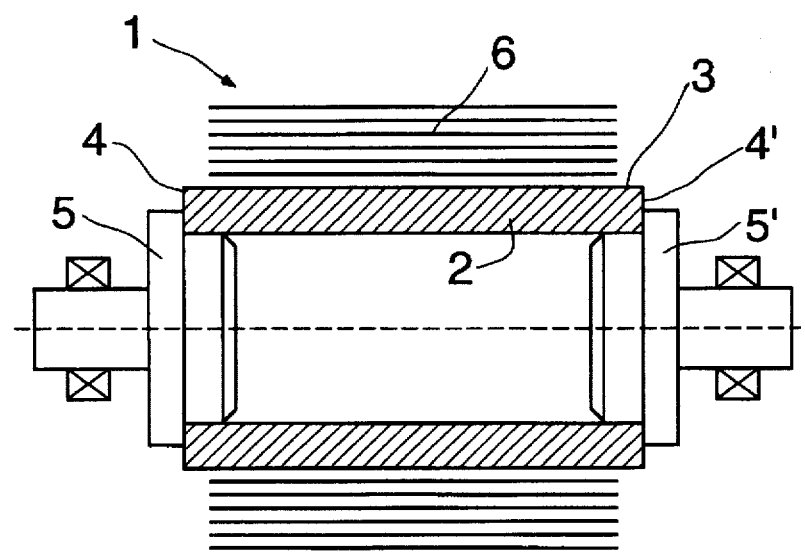
FIG. 1 shows a cross-section through the novel hub with wound-on magnetic recording medium and FIG. 2 shows the skew curve of a wound web of a magnetic recording medium over its entire length with the novel hub (a) and with a hub according to the prior art (b). In this figure, S is the skew value on the ordinate and L is the tape length on the abscissa. When L is 0, the tape (inner side) has thus been measured at the hub, and when L is >5,000 the tape has been measured at the outer circumference of the tape roll.

The hub (1) consists of a cylindrical sleeve (2) having a winding surface (3); in a preferred embodiment, it is a hollow cylinder in order to reduce the weight. The two lateral surfaces (4, 4') of the hub contain an axial bearing (5, 5') for transmitting the torque for winding the magnetic recording medium (6) at the required winding tension and the desired speed.

The wound HF hub may be considered as a thick-walled tube under external pressure (which corresponds to the winding pressure). The following is an approximation for the diameter reduction ΔD caused by the winding pressure:

$$\Delta D = \frac{P \cdot D^2}{2 E w} \quad (1)$$

where:
p=winding pressure on the hub
D=hub diameter
E=modulus of elasticity of the hub material
w=wall thickness of the hub The compression ΔD/D of the hub as a result of the winding pressure is thus:

$$\frac{\Delta D}{D} = \frac{P \cdot D}{2 E w} \quad (2)$$

As mentioned above, investigations by the applicant have shown that the compression ΔD/D must be less than 0.3% in order to avoid impermissibly high skew of the magnetic tape close to the hub. The winding pressure on the hub depends in particular on the tape tension during winding, the contact pressure of pressure roller winding aids, the wound length and the tape speed during winding.

Accordingly, for specified winding conditions (ie. for a certain winding pressure p on the hub), the hub must, in order to avoid impermissibly high skew values, be designed such that the following applies:

$$\frac{D}{E w} < \frac{0.006}{P} \quad (3)$$

The design of the hub (ie. the dimensions diameter D and wall thickness w and the choice of material, ie. modulus of elasticity) must therefore be adapted to the winding pressure used, so that the condition ΔD/D<0.3% is fulfilled. A certain combination of hub properties and winding pressure is therefore necessary.

The following procedure may be adopted for establishing a suitable hub.

First, the winding pressure p present on the hub under the prevailing winding conditions is determined for a hub of known properties (D, E, w) from the measured diameter reduction ΔD, with the aid of equation (1), in a winding test. Thereafter, the parameters D, E, w of the novel hub suitable for acceptable skew values are fixed so that equation (3) is fulfilled. As is evident from the examples, this is fulfilled, for example, in hubs of 170 mm diameter with a wall thickness w of 10 mm in the case of aluminum, with a w=20 mm in the case of hard pertinax and with a w=2 mm in the case of steel whose modulus of elasticity is $2.1 \times 10^5 N/mm^2$. Other hard (possibly glass fiber-reinforced) plastic is also suitable. However, steel has the disadvantage of greater weight, so that manual handling is more difficult. On the other hand, a pertinax hub having a wall thickness of only 10 mm is unsuitable.

In this way, magnetic recording media whose length is substantially more than 10,000 m can be wound with a maximum winding tension of 2N, based on 1 cm width of the magnetic recording medium, without impermissibly high skew values occurring on the wound recording medium, especially close to the hub.

When it consists of metal, the surface of the hub can be anodized, burnished in a bath, chromatized, hard-chrome plated or treated in a similar manner, the center line average value $R_a$ of the winding surface being not more than 10 µm, particularly preferablyless than 3 µm. The maximum surface waviness $W_t$ should be about 10 µm, and the $R_t$ value should be less than 10 µm. If, on the other hand, the hub according to the present invention comprises plastic, its surfaces may be brought to the required roughness value by operations, such as grinding and fine polishing, known from the prior art.

EXAMPLE 1

A magnetic recording medium consisting of a flexible base having a thickness of 12 µm and a magnetic layer which is cast on, has a thickness of 2.5 µm when dry and contains mainly chromium dioxide as magnetic pigment dispersed in a polymeric binder was produced, the width of the base being about 660 mm. The coated magnetically oriented, dried and calendered web was wound, over a length of about 10,000 m, at a speed of up to 800 m/min and with a web tension of about 70N, onto a hollow cylindrical aluminum hub which had a modulus of elasticity of $7.3 \times 10^4 N/mm^2$ and whose external diameter was 170 mm, whose wall thickness was 10 mm, whose width was about 700 mm and whose center line average value $R_a$ was less than 3 µm.

Figure 2:
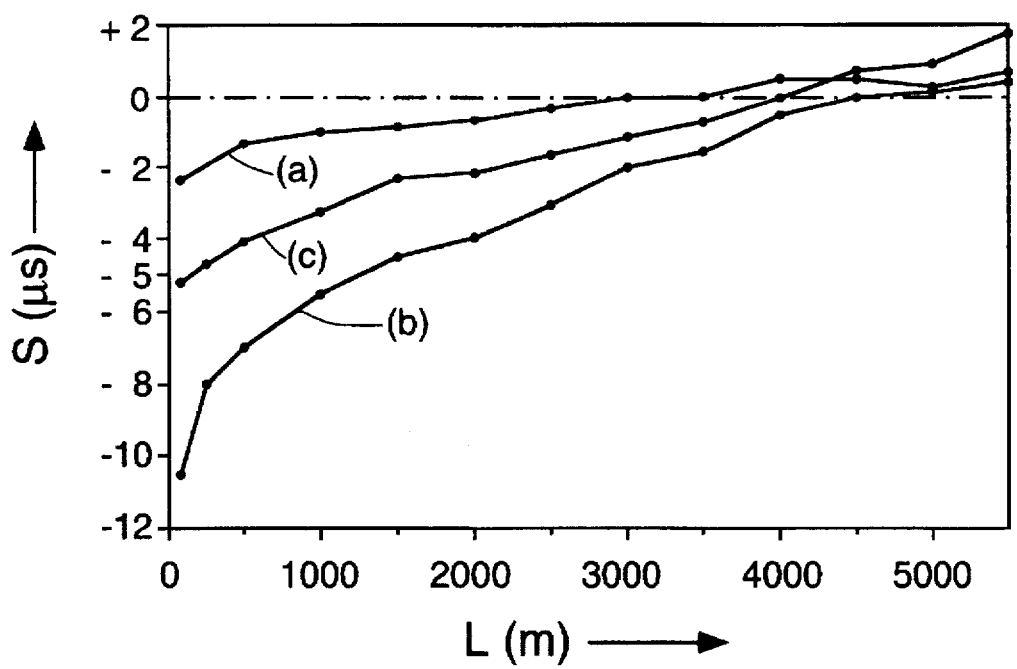

In FIG. 2, curve a shows the skew value measured over the total web length, in µs. The skew value over the total length of the magnetic recording medium is substantially less than 5 µs. Measuring methods for determining the skew value are known from the prior art, for example from the abovementioned EP-B1-350 731 of the same patent proprietor. In the present case, the skew curve was determined in the NTSC mode (525 lines/60 Hz field change television system) using a Panasonic VHS video recorder AE 6651.

In the measuring method of EP-B1-350 731, herein incorporated by reference, for determining the time error occurring as a result of the change in length of a magnetic tape between recording and playback of a video signal during helical scan recording, a pulse generator is phase-locked with the horizontal line synchronizing pulse of the video signal, and a presettable counter which is switchable in the counting direction and is timed by the pulse generator and synchronized by the horizontal line synchronizing pulse counts the pulses beginning at a counter reading which corresponds to the full line length reduced by the minimum measurable time error until the occurrence of the next horizontal line pulse, the time error corresponding to the difference between nominal line length and actual length of the line in which the head switching pulse occurs.

In the NTSC system (NTSC mode), the full line length is 63.5 µs and the clock frequency is 500 kHz or an integral multiple thereof.

During use as a half inch video tape, the beginning of the web wound in this manner also exhibited no visible disturbances of the image, for example distortions.

EXAMPLE 2

The procedure was as in Example 1, except that winding was effected on a hard pertinax hub of the same diameter, having a modulus of elasticity of $10^4 N/mm^2$ and a wall thickness w of 20 mm.

The skew values of curve (c) in FIG. 2 occurred over the tape length, with the maximum value being 5 µs.

Here too, the skew values were, surprisingly, satisfactory over the total length of the magnetic web.

COMPARATIVE EXAMPLE

The procedure was as in Example 2, except that the web was wound on a pertinax hub having a wall thickness of only 10 mm. Curve b in FIG. 2 shows the corresponding skew variation. The recording medium thus produced exhibited clearly visible distortion in the video image, especially in the first 2,000 m from the beginning of the web.

The results are summarized in the table below.

| Example | 1 | 2 | Comparison |
|---|---|---|---|
| Hub material | Aluminum | Pertinax (reinforced) | |
| Modulus of elasticity | $7.3 \cdot 10^4$ N/mm² | about $10^4$ N/mm² | |
| Wall thickness w | 10 mm | 20 mm | 10 mm |
| $\frac{D}{E \cdot w} \left[ \frac{mm^2}{N} \right]$ | $2.3 \times 10^{-4}$ | $8.5 \cdot 10^{-4}$ | $17 \cdot 10^{-4}$ |
| at p = 5 N/mm² ΔD/D = | 0.06% | 0.21% | 0.42% |
| Skew curve | = Example (a) in FIG. 2 | = Example (c) in FIG. 2 | = Example (b) in FIG. 2 |
| Skew value of magnetic tape | Satisfactory | Satisfactory | Poor |

We claim:

1. A hollow cylindrical hub for winding a magnetic tape having a length of at least 5000 meters, wherein the condition is fulfilled, that the hub diameter divided by the modulus of elasticity of the hub material and by the wall thickness of the hub is less than the factor $6 \cdot 10^{-3}$ divided by the winding pressure on the winding surface of the hub in a formula $$\frac{D}{E \cdot w} < 0.006/p$$

in which p = winding pressure on the winding surface of the hub

D = hub diameter

E = modulus of elasticity of the hub material w = wall thickness of the hub.

2. A hub as defined in claim 1, wherein the reduction of the hub diameter is less than 0.3%.

3. A hub as defined in claim 1, which consists of the group of materials steel, aluminum, hard pertinax or another plastic which optionally may contain reinforcing material.

4. A hub as defined in claim 1 wherein the hub surface has a center line average value Ra of not more than 10 μm.

5. A magnetic tape having a length of at least 5,000 meters, wound on a hollow cylindrical hub according to the condition that the hub diameter divided by the modulus of elasticity of the hub material and by the wall thickness of the hub is less than the factor $6 \cdot 10^{-3}$ divided by the winding pressure on the winding surface of the hub $$\frac{D}{E \cdot w} < 0.006/p$$

in which p = winding pressure on the winding surface of the hub

D = hub diameter

E = modulus of elasticity of the hub material w = wall thickness of the hub, whereby the magnetic recording media after winding has a skew error of not more than 5 μs over its total length of at least 5000 meters.

* * * * *